United States Patent
Morrison et al.

(10) Patent No.: US 11,662,779 B2
(45) Date of Patent: May 30, 2023

(54) INFORMATION HANDLING SYSTEM VARIABLE TORQUE HINGE

(71) Applicant: Dell Products L.P., Round Rock, TX (US)

(72) Inventors: Jason S. Morrison, Chadron, NE (US); Anthony J. Sanchez, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 360 days.

(21) Appl. No.: 16/916,444

(22) Filed: Jun. 30, 2020

(65) Prior Publication Data

US 2021/0405711 A1 Dec. 30, 2021

(51) Int. Cl.
*G06F 1/16* (2006.01)
*F16H 3/30* (2006.01)
*E05D 3/12* (2006.01)
*E05D 11/10* (2006.01)
*F16C 11/04* (2006.01)
*H01F 7/08* (2006.01)
*F16C 11/10* (2006.01)

(52) U.S. Cl.
CPC .......... *G06F 1/1681* (2013.01); *E05D 3/122* (2013.01); *E05D 11/1028* (2013.01); *F16C 11/04* (2013.01); *F16C 11/10* (2013.01); *F16H 3/30* (2013.01); *G06F 1/1656* (2013.01); *H01F 7/081* (2013.01); *E05Y 2201/218* (2013.01); *E05Y 2201/462* (2013.01); *E05Y 2900/606* (2013.01)

(58) Field of Classification Search
CPC combination set(s) only.
See application file for complete search history.

(56) References Cited

U.S. PATENT DOCUMENTS

| | | | |
|---|---|---|---|
| 8,564,944 B2 | 10/2013 | Whitt, III et al. | |
| 9,353,560 B2 | 5/2016 | Sprenger et al. | |
| 9,411,365 B1 | 8/2016 | Tanner et al. | |
| 9,483,126 B2 | 11/2016 | Sprenger et al. | |
| 10,928,864 B1* | 2/2021 | Sanchez | G06F 1/1681 |
| 11,009,919 B2* | 5/2021 | Hsu | F16C 11/04 |
| 11,016,539 B2* | 5/2021 | Hallar | G06F 1/1618 |
| 11,016,540 B2* | 5/2021 | Hallar | G06F 1/1618 |
| 11,093,008 B2* | 8/2021 | Hallar | E05D 11/1028 |
| 11,099,611 B2* | 8/2021 | Hallar | G06F 1/1618 |
| 11,353,056 B2* | 6/2022 | Guo | E05D 3/122 |

(Continued)

*Primary Examiner* — Lisa Lea-Edmonds
(74) *Attorney, Agent, or Firm* — Zagorin Cave LLP; Robert W. Holland

(57) ABSTRACT

A portable information handling system rotationally couples housing portions with a variable torque hinge having a first axle that rotates with a first housing portion, a second axle that rotates with a second housing portion and a synchronizing gear assembly that translates rotation between the first and second axles. Variable torque is applied by selectively engaging and disengaging a coupler gear with the synchronizing gear assembly to apply and remove an increased torque that resists housing rotation. In one embodiment, the coupler gear is an idler gear of the synchronizing gear mechanism that selectively applies and removes an increase torque of the second axle to the first axle. The coupler gear slides in response to an actuator, such as an electro-permanent magnet acting on a ferromagnetic material with high and low magnetic attraction states.

16 Claims, 4 Drawing Sheets

(56) References Cited

U.S. PATENT DOCUMENTS

| | | | |
|---|---|---|---|
| 11,516,932 B2* | 11/2022 | Sim | H05K 5/0226 |
| 2007/0186382 A1 | 8/2007 | Huang | |
| 2009/0316348 A1 | 12/2009 | Tseng et al. | |
| 2014/0146484 A1 | 5/2014 | Chen | |
| 2014/0251040 A1* | 9/2014 | Hsu | G06F 1/1681 |
| | | | 74/63 |
| 2017/0068283 A1 | 3/2017 | Liang et al. | |
| 2018/0058120 A1 | 3/2018 | Hamel | |
| 2018/0074545 A1 | 3/2018 | McBroom et al. | |
| 2020/0233459 A1 | 7/2020 | Sanchez | |
| 2020/0310497 A1* | 10/2020 | Hsu | E05D 3/18 |
| 2021/0072800 A1* | 3/2021 | Lin | G06F 1/1681 |
| 2021/0096607 A1* | 4/2021 | Hallar | G06F 1/1681 |
| 2021/0096608 A1* | 4/2021 | Hallar | E05D 11/1028 |
| 2021/0096609 A1* | 4/2021 | Hallar | G06F 1/1681 |

\* cited by examiner

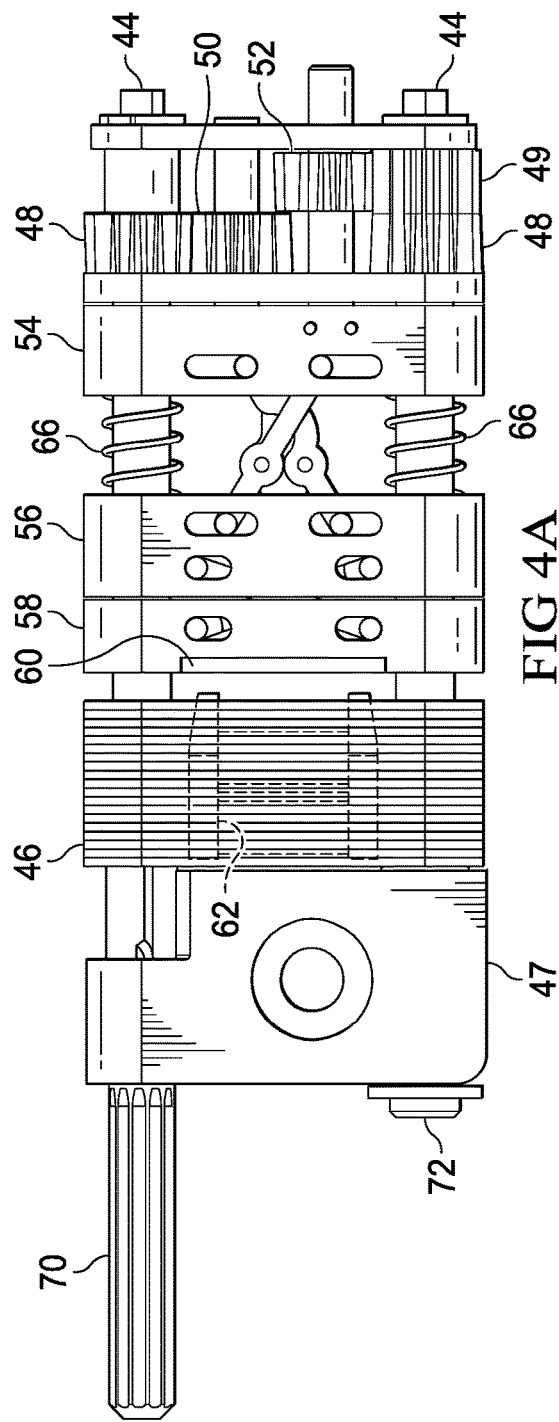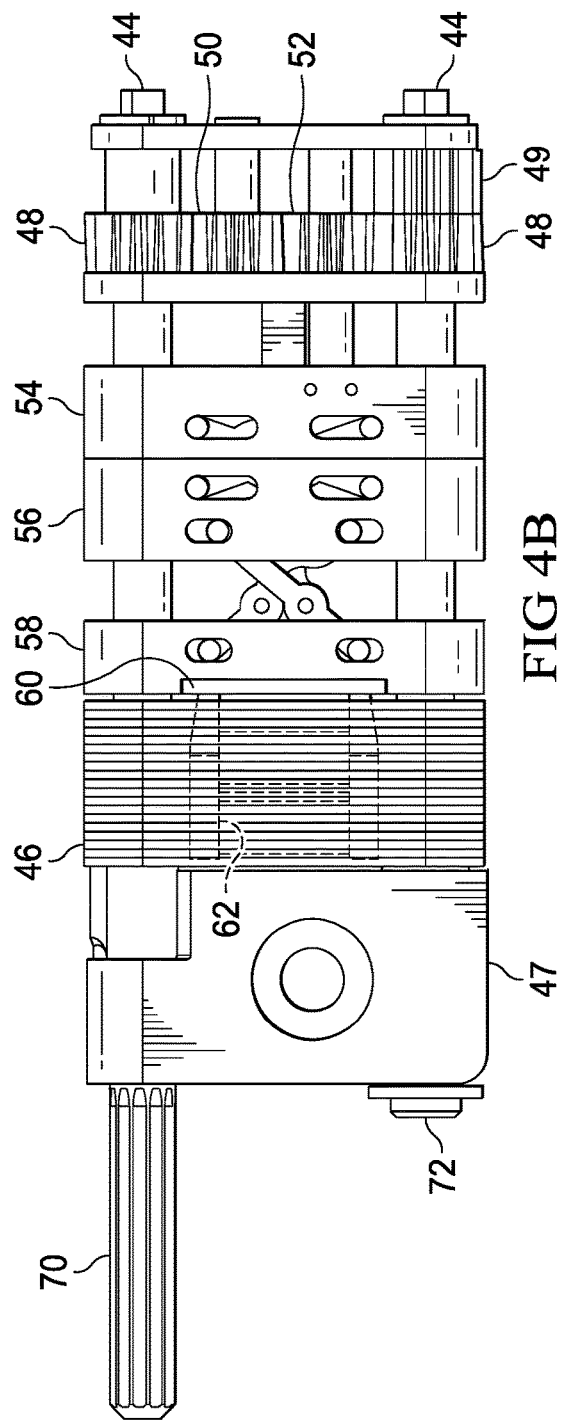

INFORMATION HANDLING SYSTEM VARIABLE TORQUE HINGE

BACKGROUND OF THE INVENTION

Field of the Invention

The present invention relates in general to the field of portable information handling systems, and more particularly to an information handling system variable torque hinge.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Generally, end users prefer portable information handling systems to have minimal thickness and weight. One difficulty that arises as information handling system thickness and weight decrease is that the system housing is driven to use minimal material that can lead to less housing strength. Generally, some friction devices are interfaced with information handling system hinges to create torque that resists housing rotation. Reduced housing structure can suffer from torsional forces induced during housing rotation if the torque is too great. Insufficient torque can result in undesired housing movements, such as when an end user is viewing a display or when the system is closed by allowing movement from the closed position during transportation and storage of the system. Another difficulty with thin and low-weight housings is that the weight of the base housing portion can be insufficient to hold the system on a support surface during rotation of the lid housing portion. For example, an end user attempt to lift on the lid housing portion to rotate the display to a viewing position can lift the entire system instead of overcoming hinge torque to rotate the lid housing portion. As a result, an end user has to use two hands to rotate the lid housing portion open, one hand on the lid housing portion to lift and the other hand on the base housing portion to hold it down.

One solution for addressing rotation of thin and lightweight housings is to use a variable torque hinge. For example, reducing torque at a hinge when an end user desires to rotate the housing portions supports reduced torsional forces at the housing and allows a one hand rotational movement. Increasing torque at the hinge holds the display steady during viewing and maintains the closed position during transportation. One difficulty with variable torque hinges is that torque profiles tend to be inconsistent for opening and closing the housing. Typically, variable torque hinges rely on a friction device that varies friction based upon rotational angle; however, this generally means a high friction to initially open the housing so that the housing stays closed during transportation. Alternatively, a detent can hold the housing closed and then a reduced torque can be applied as the housing starts to open. In either instance, such variable torque hinges tend to need two hands to start housing rotation. In addition, torque tolerance regions tend to increase due to part and assembly tolerances. Active management of torque levels can become complex, which increases the hinge size.

SUMMARY OF THE INVENTION

Therefore, a need has arisen for a system and method which provides variable torque for rotation of a portable information handling system with active management in a compact form.

In accordance with the present invention, a system and method are provided which substantially reduce the disadvantages and problems associated with previous methods and systems for providing variable torque for rotation of information handling system housing portions. A coupler gear selectively engages and disengages with a synchronizing gear assembly to provide a high torque state and a low torque state at a variable torque hinge. In one example embodiment, the coupler gear engages as an idler gear of the synchronizing gear assembly to provide torque of a secondary axle with that of a primary axle and disengages to remove torque of the secondary axle so that torque of the primary axle manages housing rotation.

More specifically, an information handling system processes information with processing components disposed in a portable housing having first and second housing portions rotationally coupled by first and second variable torque hinges. One or more sensors disposed at the housing provide detection of end user action to rotate the housing portions and command the variable torque hinges to provide a low or high torque state. Each variable torque hinge has dual parallel axles that translate rotation between each other through a synchronizing gear assembly. The dual axles interface with a torque engine that generates a first torque against rotation of a first axle and a second torque against rotation of the second axle, which can but need not be greater than the first torque. A coupler gear selectively interfaces with the synchronizing gear assembly as an idler gear to support translation of rotation between the dual axles for the high torque state having torque generated by both axles and disengages to remove translation of rotation between the dual axles for a low torque state generated by only one axle. An electro-permanent magnet acts as an actuator to axially slide the coupler gear into and out of engagement with the synchronizing gear assembly. For instance, the electro-permanent magnet pulls a steel plate coupled to a drive shuttle towards the magnet in a high magnetic state, and the drive shuttle axially slides the coupler gear into an engaged position by translation of the axial movement through an idler shuttle and output shuttle. When the electro-permanent magnet transitions to a low magnetic state, a biasing spring pushes the output shuttle and coupler gear to a disengaged position for the low torque state. With the hinge coupled to a first housing portion and one of the axles coupled to the other housing portion, a single axis rotation is provided with variable torque generated by selective engagement and disengagement of the coupler gear.

The present invention provides a number of important technical advantages. One example of an important technical advantage is that a variable torque hinge provides a predictable high and low torque profile at any rotational orientation to control housing portion rotation. An electro-permanent magnet maintains a high torque profile with a high magnetic state and changes between high and low magnetic states with a minimal current usage. A three shuttle sliding mechanism provides a robust and smooth transition between high and low torque states by translating movement generated by the high magnetic state and opposing biasing springs in a low magnetic state to the coupler gear. The coupler gear engages with an extended main gear of one axle to maintain continuous teeth meshing throughout axial sliding movement for reduced backlash. Predictable torque management in high and low torque states allows more precise housing strength constraints so that thin and low-weight housings are achieved with robust structures and minimal materials.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4A and 4B depict an upper perspective view of the variable torque hinge in high and low torque positions.

DETAILED DESCRIPTION

Information handling system housing portions rotate relative to each other with a variable torque. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
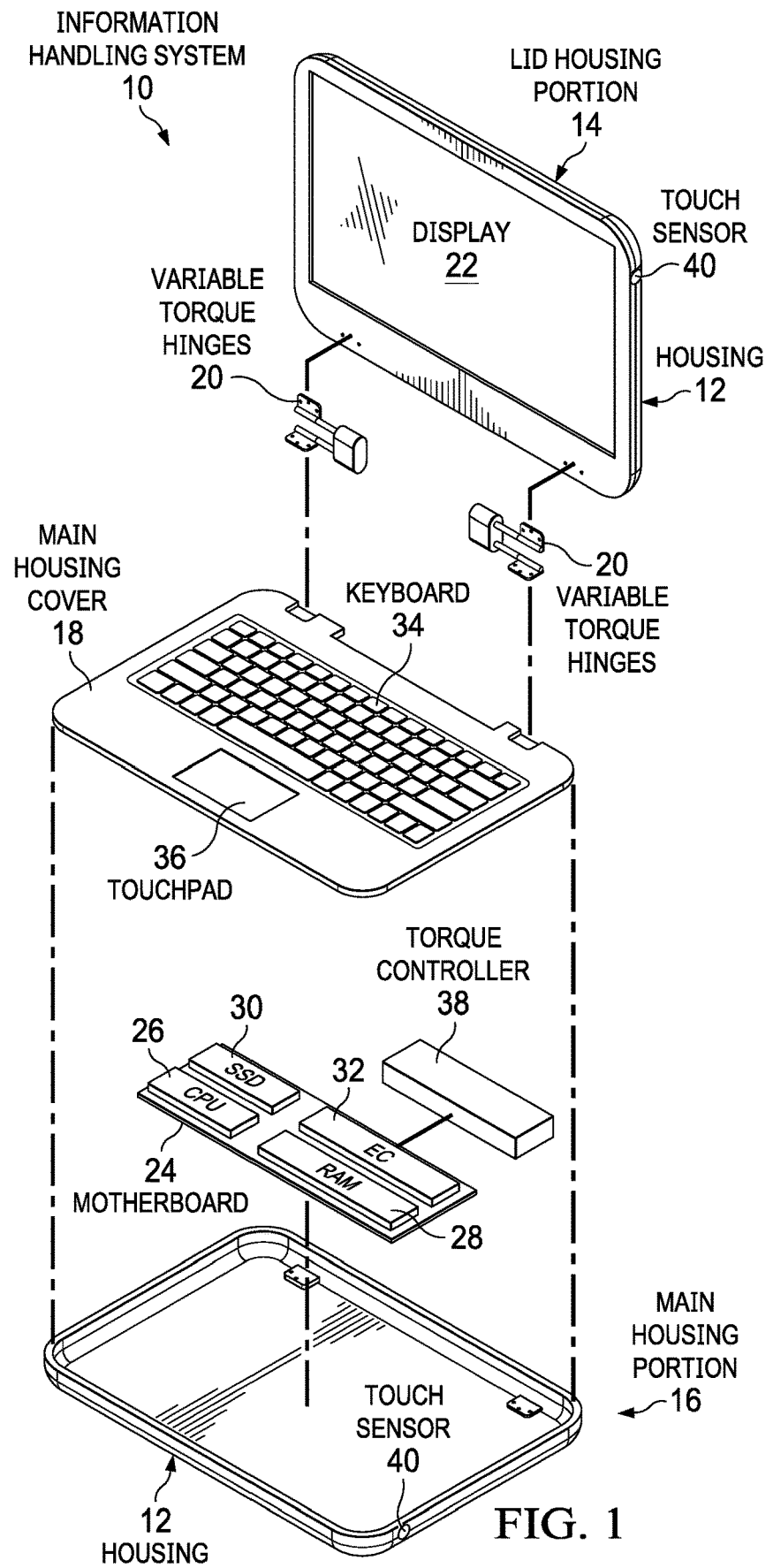
FIG. 1 depicts an exploded view of an information handling system having a variable torque hinge.

Referring now to FIG. 1, an exploded view depicts an information handling system 10 having a variable torque hinge 20. Information handling system 10 is built in a portable housing having a lid housing portion 14 rotationally coupled to a main housing portion 16 by first and second variable torque hinges 20 that couple to lid housing portion 14 and main housing portion 16. A main housing cover 18 couples over main housing portion 16 to cover processing components that process information. A display 22 integrates in lid housing portion 14 to present information as visual images. A motherboard 24 couples in main housing portion 16 to support communication between processing components. In the example embodiment, the processing components includes a central processing unit (CPU) 26 that executes instructions to process information and a random access memory (RAM) 28 that stores the instructions and information. A solid state drive (SDS) 30 or other persistent storage device stores information in non-transitory memory during power down periods, such as an operating system and applications that are retrieved at power up to RAM 28. An embedded controller (EC) 32 manages operating conditions of the processing components, such as controlling power and thermal management devices. In addition, EC 32 manages input devices, such by communicating inputs made at a keyboard 34 and touchpad 36 for application by CPU 26.

In the example embodiment, variable torque hinges 20 interface with a torque controller firmware module 38 executing on EC 32 to selectively increase and decrease torque generated against rotation of lid housing portion 14 and main housing portion 16. For example, torque controller 38 is embedded code stored in non-transitory memory of embedded controller and interfaced with touch sensors 40 located on lid housing portion 14 and main housing portion 16. When an end user touch is detected at touch sensors 40 indicating an end user desire to rotate the housing portions, EC 32 commands a reduced torque so that less end user force is needed to rotate the housing portions. When touch sensors 40 do not detect an end user touch, EC 32 commands an increased torque that holds the housing portions in their relative position. As an example, touch sensors 40 are capacitive sensors interfaced with a low power system on chip processor. In one example embodiment, touch sensors 40 may include touch controller 38 as embedded code executing on the system on chip or other processing resource. In alternative embodiments, other types of sensors or input devices may be used to command a change in torque, such as a push button. Generally, selecting low torque reduces stress on housing 12 during adjustment of rotational orientation and selecting high torque maintains housing orientation during system use and in the closed position.

Figure 2:
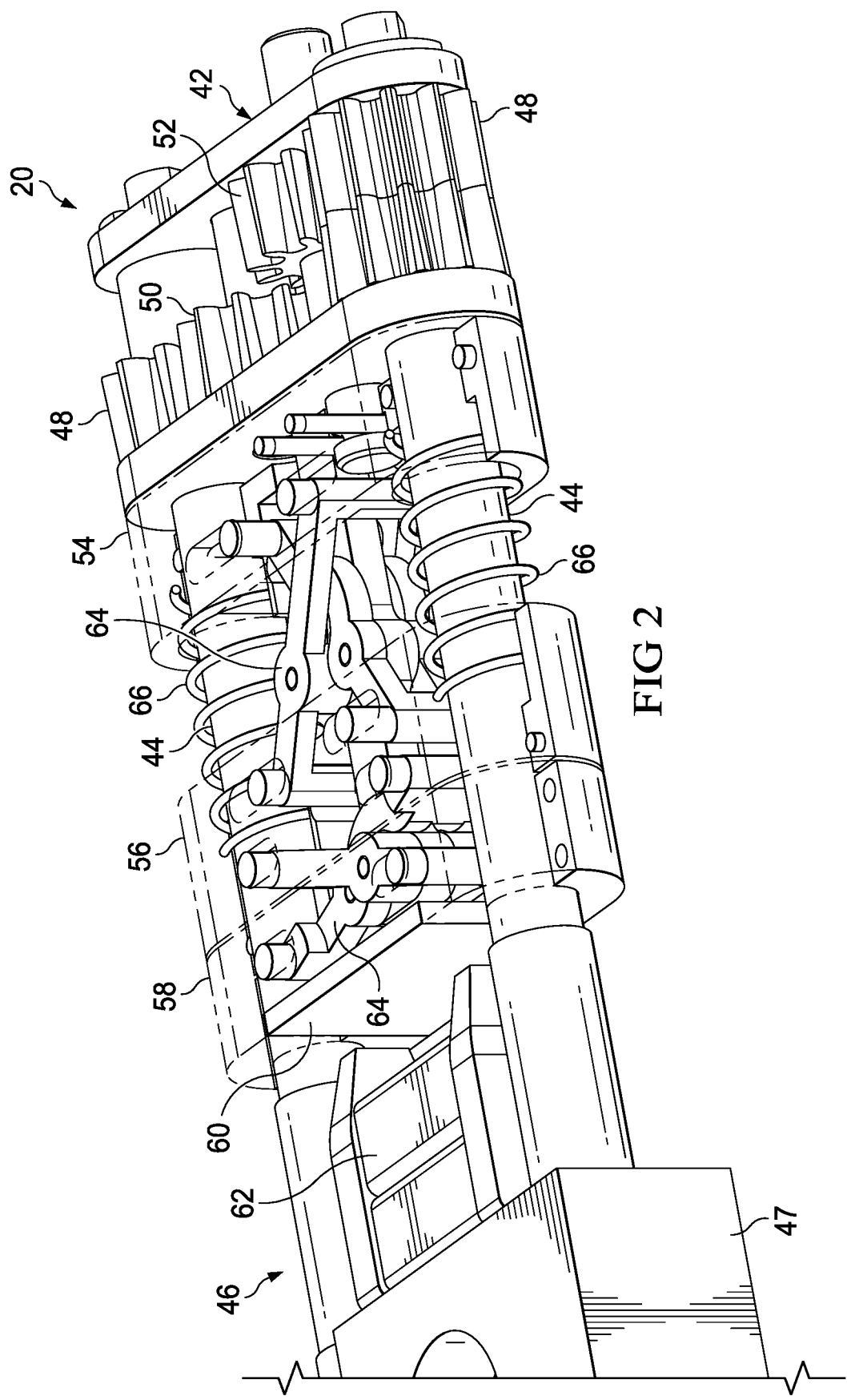
FIG. 2 depicts a side perspective cutaway view of a variable torque hinge in a reduced torque configuration.

Referring now to FIG. 2, a side perspective cutaway view depicts a variable torque hinge 20 in a reduced torque configuration. In the example embodiment, a synchronizing gear assembly 42 couples to parallel dual axles 44 that each provide a rotational axis, such as to couple each axle 40 to opposing housing portions or to couple variable torque hinge 20 to one housing portion and have one of the axles 40 rotate the other housing portion in a single rotational axis configuration. A main gear 48 couples to each axle 44 to turn with its associated axle. An idler gear 50 and a coupler gear 52 selectively engage to provide synchronous rotation of axles 44 through main gears 48. To generate variable torque, axles 40 couples to a torque engine 46 (location indicated by arrow) with each axle 40 working against a different level of friction provided by the torque engine 46. For instance, a low resistance torque may be provided with one axle 40 while the combined torque of both axles 40 provide a high resistance based on the sum of the torque of both axles. Coupler gear 52 selectively slides relative to idler gear 50 between the disengaged position shown and an engaged position. In the disengaged position, main gears 48 do not translate rotation between each other so that only the axle with the least torque provides rotation of the housing portions. When coupler gear 52 slides into engagement with idler gear 50, then the axle 40 with greater torque also rotates in a synchronized manner so that torque working against housing rotation is increased. In the example embodiment, the main gear 48 next to coupler gear 52 has an increased length so that coupler gear 52 maintains engagement with the main gear 48 at all times to reduce risk of binding during axial movement and re-engagement with idler gear 50. The example embodiment depicts coupler gear 52 as one of the idler gears of synchronizing gear assembly 42; however, in an alternative embodiment, coupler gear 52 may be a fifth gear that selectively engages with any other gear of synchronizing gear assembly 42 and torque engine 46 so that synchronous axle movement is maintained with high and low torque selections. In the example embodiment, a mounting bracket 47 couples to one housing portion and an axle 44 couples to the other housing portion so that the housing portions rotate relative to each other about one axle while the other axle 40 selectively rotates to increase torque. In an alternative embodiment, each axle may couple to separate housing portion for synchronous rotation, such as with a fifth gear that adds torque selectively engaged with one of the gears of the synchronous gear assembly.

Coupler gear 52 slides axially into and out of engagement with idler gear 50 under the influence of an actuator working through interconnected shuttles that each couple to both axles 44. In the example embodiment, an output shuttle 54 fixedly couples to coupler gear 52 to slide coupler gear 52 between the engaged and disengaged positions. Springs 66 disposed around each axle 44 bias coupler gear 52 to the disengaged position by pushing output shuttle 54 towards synchronizing gear assembly 42. A drive shuttle 58 interacts with an actuator to move away from synchronizing gear assembly 42 when actuated by a command for a high torque setting. In the example embodiment, the actuator is an electro-permanent magnet 62 disposed within torque engine 46 and a ferromagnetic material coupled to drive shuttle 58, such as a steel plate 60. Electro-permanent magnet 62 cycles between a high magnetic state and a low magnetic state each time current is applied to it, such as by the embedded controller. Advantageously, the electro-permanent magnet changes its magnetic state in response to a brief current so that the position of coupler gear 52 may be maintained without power consumption. For example, electro-permanent magnet 62 has two permanent magnets next to each other with one of the permanent magnets having a lower coercivity and a magnetizing coil to flip its polarization. In the low magnet state, springs 66 bias steel plate 60 away from electro-permanent magnet 62 through the action of the shuttles as described further below. In alternative embodiments, other types of actuators may be used, such as a solenoid.

An idler shuttle 56 translates motion between output shuttle 54 and drive shuttle 58 through a series of scissor linkages 64. A first scissors linkage 64 couples between idler shuttle 56 and output shuttle 54 and a second scissors linkage 64 couples between drive shuttle 58 and idler shuttle 56. The scissors linkages 64 are setup with offset rotation axes so that the input side moves less than the output side. Motion from the drive shuttles generate more than double the motion at output shuttle 54 although the shuttles move in the same direction. For example, drive shuttle 58 has a range of motion of approximately 0.75 mm and output shuttle 54 has range of motion of approximately 2.1 mm. Idler shuttle 56 slides between output shuttle 54 and drive shuttle 58 as motion is induced by changes in the magnetic state of electro-permanent magnet 62 and springs 66.

Figure 3B:
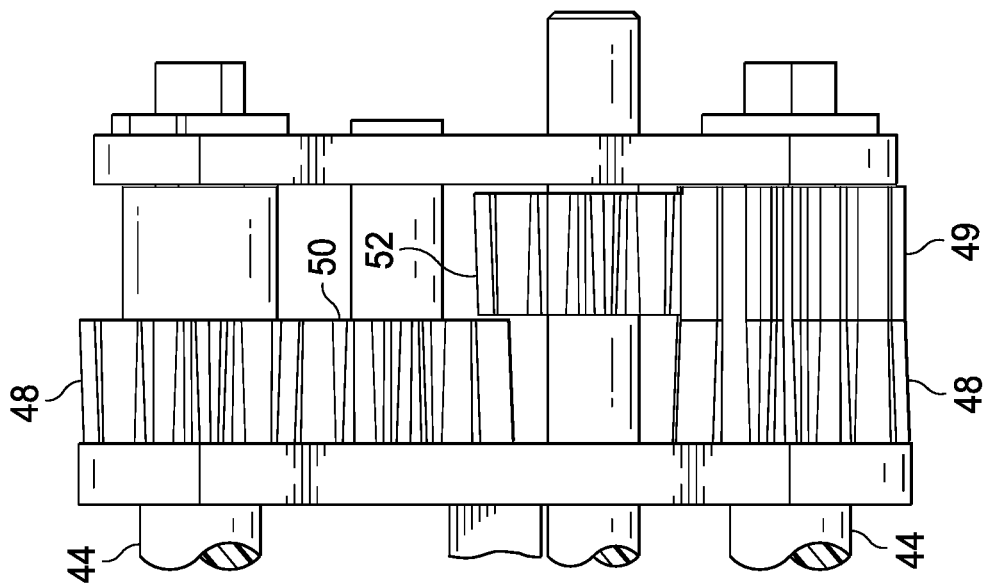
FIGS. 3A and 3B depict an upper cutaway view of a coupler gear in high and low torque positions.
Figure 3A:
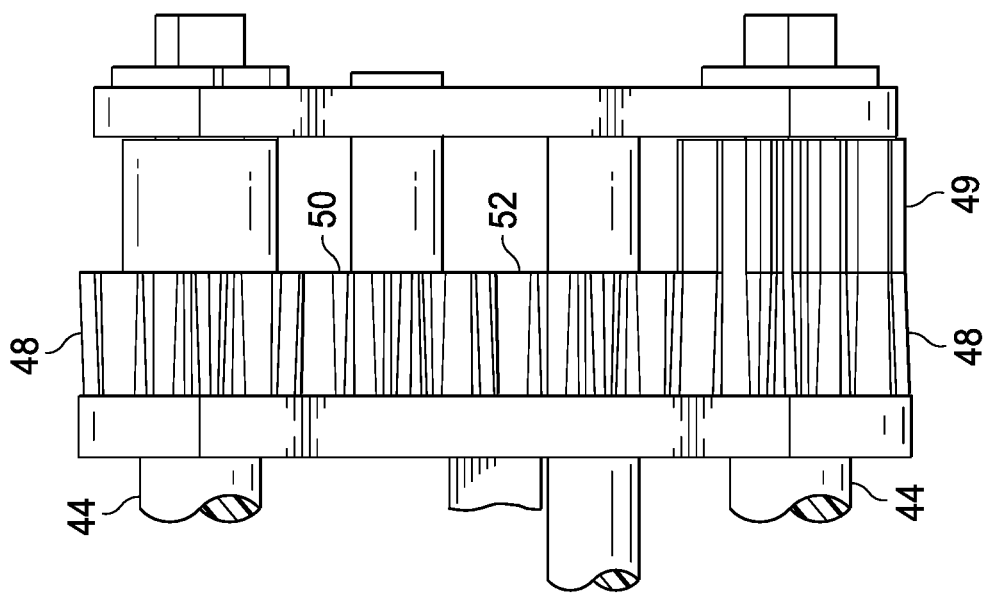

Referring now to FIGS. 3A and 3B, an upper cutaway view depicts a coupler gear 52 in high and low torque positions. FIG. 3A depicts coupler gear 52 pulled into engagement with idler gear 50 so that rotation of main gears 48 is translated between each other by coupler gear 52 and idler gear 50. In the example embodiment, coupler gear 52 becomes an idler gear of the synchronizing gear assembly. FIG. 3B depicts coupler gear 52 pushed out of engagement with idler gear 50 so that rotation of main gears 48 is not translated between each other. Thus, for instance, an information handling system housing rotates working only against torque resisting one of the axles. The main gear 48 next to coupler gear 52 has a main gear extension so that coupler gear 52 and main gear 48 have their gear teeth continuously engaged through the axial sliding motion of coupler gear 52. The gear teeth of coupler gear 52 are slightly tapered to aid in alignment with idler gear 50 and avoid backlash. The main gear extension also helps to reduce backlash as coupler gear 52 only has to re-mesh with idler gear 50 during axial sliding motion to re-engage synchronous axle motion. If coupler gear 52 and idler gear 50 teeth do not initially mesh, coupler gear 52 will remain in the disengaged position until idler gear 50 turns slightly to allow the tapered teeth to slide into engagement.

Referring now to FIGS. 4A and 4B, an upper perspective view depicts the variable torque hinge in high and low torque positions. FIG. 4A depicts output shuttle 54 biased towards synchronizing gear assembly 42 with springs 66 to slide couple gear 52 out of engagement with idler gear 50. Idler shuttle 56 slides away from output shuttle 54 to translate motion imparted by springs 66 so that drive shuttle 58 moves away from electro-permanent magnet 62 disposed within torque engine 46. FIG. 4B depicts output shuttle 54 pulled away from synchronizing gear assembly 42 when a high magnetic state of electro-permanent magnet 62 pulls steel plate 60 down towards torque engine 46. Idler shuttle 56 slides up towards output shuttle 54 so that downward motion of drive shuttle 58 is translated by scissor linkages 64 to pull coupler gear 52 into engagement with idler gear 50.

As discussed above, mounting bracket 47 couples to one housing portion of the information handling system and a primary shaft 70 couples to the other housing portion so that rotation of the housing portions is provide at the axis defined by primary shaft 70. Torque engine 46 is a set of friction plates having a lower friction associated with the axle 44 of primary shaft 70 and a greater friction associated with the axle 44 of secondary shaft 72. For example, secondary shaft 72 generates 60 to 80% of the total hinge torque when coupler gear 52 engages synchronous axle rotation. In alternative embodiments, dual axle rotation may be used by coupling each axle to a housing portion. Further, a separate fifth gear may be used to interface increased torque to the synchronizing gear assembly with both idler gears fixed in position.

Although the present invention has been described in detail, it should be understood that various changes, substitutions and alterations can be made hereto without departing from the spirit and scope of the invention as defined by the appended claims.

What is claimed is:

1. An information handling system comprising:
    a housing having first and second housing portions;
    a processor disposed in the housing and operable to execute instructions that process information;
    a memory disposed in the housing and interfaced with the processor, the memory operable to store the instructions and information;
    an embedded controller disposed in the housing and interfaced with the processor, the embedded controller operable to manage one or more operating conditions of the information handling system; and
    a hinge rotationally coupling the first and second housing portions, the hinge having a first axle associated with a first torque resistance to rotation, a second axle associated with a second torque resistance to rotation and a coupler selectively aligned to engage and disengage the second axle second torque resistance to work against rotation of the first and second housing portions.

2. The information handling system of claim 1 further comprising:
    an actuator interfaced with coupler and operable to selectively align the coupler to engage and disengage the second axle second torque resistance; and
    a sensor operable to detect a predetermined condition, the actuator engaging and disengaging based upon the predetermined condition.

3. The information handling system of claim 2 wherein the actuator comprises:
    an electro-permanent magnet configured to transition between high and low magnetic attraction states based upon the predetermined condition;
    a ferromagnetic material coupled to the coupler and aligned with the electro-permanent magnet; and
    a biasing device interfaced with the coupler to bias the ferromagnetic material away from the electro-permanent magnet in the low magnetic state.

4. The information handling system of claim 1 wherein the hinge further comprises:
    a first synchronizing gear coupled to the first axle;
    a second synchronizing gear coupled to the second axle;
    an idler gear engaged with the first synchronizing gear; and
    a coupler gear coupled to the coupler and engaged with the second synchronizing gear, the coupler gear selectively engaging and disengaging with the idler synchronizing gear, the coupler gear translating rotation between the second axle and the first axle when engaged with the idler.

5. The information handling system of claim 4 wherein the actuator further comprises:
    a drive shuttle coupled to the first and second axles in a sliding relationship and to the actuator;
    an output shuttle coupled to the first and second axles in a sliding relationship and to the coupler; and
    an idler shuttle coupled to the first and second axles between the drive shuttle and the output shuttle, the idler shuttle translating sliding motion induced to the drive shuttle by the actuator to the output shuttle, the output shuttle translating sliding movement to the coupler gear.

6. The information handling system of claim 5 wherein the actuator comprises:
    a ferromagnetic material coupled to the drive shuttle; and
    an electro-permanent magnet aligned with the ferromagnetic material, the electro-permanent magnet transitioning between high and low magnetic attraction states based upon a predetermined condition.

7. The information handling system of claim 6 further comprising:
    a first spring disposed on the first axle; and
    a second spring disposed on the second axle;
    wherein the first and second springs bias the ferromagnetic material away from the electro-permanent magnet.

8. The information handling system of claim 6 further comprising:
    a first scissors linkage coupled to the drive shuttle and the idler shuttle; and
    a second scissors linkage coupled to the output shuttle and the idler shuttle.

9. The information handling system of claim 5 wherein:
    the second synchronizing gear has a length sufficient to remain engaged with the coupler gear during sliding of the coupler gear; and
    the idler gear has a length of less than the second synchronizing gear to disengage the coupler gear when the coupler slides in response to the actuator.

10. A method for managing information handling system housing rotation torque, the method comprising:
    coupling a first portion of the housing to a first axle of a hinge;
    coupling a second portion of the housing to a second axle of the hinge;
    interfacing the first and second axles with a synchronizing gear assembly to synchronize rotation of the housing portions; and
    selectively interfacing a coupler gear with the synchronizing gear assembly to apply torque of a torque engine to resist rotation of the housing portions.

11. The method of claim 10 wherein the selectively interfacing further comprises:
    interfacing the coupler gear with a ferromagnetic material;
    engaging the coupler gear with the synchronizing gear assembly by commanding a high magnetic state of an electro-permanent magnet to slide the coupler gear to an engaged position; and
    disengaging the coupler gear with the synchronizing gear assembly by commanding a low magnetic state of the electro-permanent magnet to slide the coupler gear to a disengaged position with a biasing device.

12. The method of claim 11 wherein:
    the coupler gear engages in the engaged position with a second axle gear of the synchronizing gear assembly that rotates with the second axle and with an idler gear of the synchronizing gear assembly; and the coupler gear in the disengaged position disengages translation of rotation between the second axle gear and the idler gear.

13. The method of claim 12 wherein the torque engine couples to the second axle and the coupler gear applies torque of the torque engine by interfacing the second axle gear with the idler gear and removes applying of torque of the torque engine by removing the interfacing of the second axle gear and the idler gear.

14. The method of claim 13 further comprising:
coupling the torque engine to each of the first and second axles;
applying a first friction against the first axle to generate a first torque; and
applying a second friction against the second axle to generate a second torque of greater than the first torque.

15. The method of claim 11 wherein the selectively interfacing the coupler gear with the synchronizing gear further comprises:

coupling an output shuttle to the coupling gear and to the first and second axles;
coupling a drive shuttle to an actuator and to the first and second axles;
coupling and idler shuttle to the first and second axles between the output shuttle and the drive shuttle;
coupling a first scissors linkage to the output shuttle and the idler shuttle;
coupling a second scissors linkage to the drive shuttle and the idler shuttle; and
translating movement induced by an actuator at the drive shuttle to the output shuttle through the idler shuttle with the first and second scissors.

16. The method of claim 15 wherein the actuator comprises:
a ferromagnetic plate coupled to the drive shuttle; and
an electro-permanent magnet disposed proximate the ferromagnetic plate.

* * * * *